Patented Jan. 22, 1935

1,988,575

UNITED STATES PATENT OFFICE 1,988,575

COMPLEX METAL COMPOUND OF POLYHYDROXY BENZENE DERIVATIVES AND PROCESS OF MAKING IT

Hans Schmidt, Vohwinkel, near Elberfeld, Germany, assignor to Winthrop Chemical Company, Inc., New York, N. Y., a corporation of New York No Drawing. Application February 16, 1928, Serial No. 254,893. In Germany February 24, 1927

11 Claims. (Cl. 260—11)

The present invention relates to new complex metal salts of polyhydroxy compounds of benzene derivatives containing at least two hydroxy groups in ortho-position and to a process of preparing the same.

Complex metal salts of polyhydroxy benzene compounds containing at least two hydroxy groups in ortho-position and, at least one acid group, the hydrogen atom of which may be replaced by an alkali metal, and a metal capable of being converted from a lower into a higher stage of oxidation, have been described heretofore, for example, in U. S. Patents Nos. 1,549,154, 1,718,492, and 1,718,493.

In accordance with the present invention, the above-mentioned complex compounds are converted by the action of oxidizing agents into new products. Various oxidizing agents can be employed, for example hydrogen peroxide, magnesium peroxide, sodium persulfate and the like. In some instances, it is also possible to use elementary oxygen. The oxidation is generally effected in solution. The solutions containing the new compounds are evaporated, or the new compounds are precipitated by means of a suitable organic medium, e. g. methyl alcohol. In some cases the complex compounds may be oxidized in their solid form.

The new compounds are generally colored powders soluble in water and generally are less toxic than the unoxidized compounds.

The following examples will illustrate my invention without limiting it thereto:

*Example 1.*—8 grams of potassium antimony di-(pyrocatechin-disulfonate) are treated with 12 ccs. of hydrogen peroxide of 3% strength, neutralized with dilute caustic potash and evaporated. The residue from evaporation dissolves readily in water and contains antimony in its pentavalent form (no further absorption of iodine). If desired, the residue can be re-dissolved in water, neutralized with dilute caustic potash and precipitated by pouring into methyl alcohol.

*Example 2.*—12 grams of potassium stannous pyrocatechin disulfonate are dissolved in 100 ccs. of water and a rapid current of air is passed through until a test portion diluted with water, no longer absorbs iodine. The solution is then evaporated. The residue is a complex compound of tetravalent tin, which readily dissolves in water.

*Example 3.*—20 grams of the potassium salt of manganesepyrocatechin disulfonic acid are dissolved in 100 ccs. of water, and through this solution a strong current of air is passed during at least 24 hours. Then the solution is poured into methyl alcohol, the precipitated new compound is filtered, washed with methyl alcohol and dried in an exsiccator. It is a dark colored powder easily soluble in water with a greenish coloration.

*Example 4.*—81 grams of the potassium salt of the antimony di-(pyrogallol-disulfonic acid) are suspended in 80 ccs. of water, and a mixture of 24 grams of hydrogen peroxide (30%) and 24 ccs. of water is added. On stirring the mass dissolves. After some time the solution is neutralized with diluted caustic potash solution, filtered, and the new complex compound of the pentavalent antimony is precipitated by pouring the solution into methyl alcohol. The reaction probably proceeds according to the following equation:

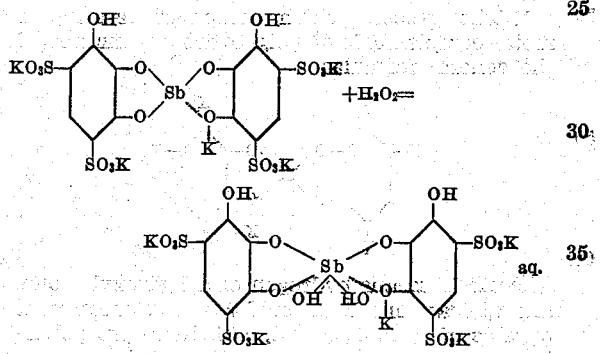

The new complex compound is a yellowish powder easily soluble in water from which it is not precipitated by caustic soda solution or by hydrochloric acid. It is a therapeutically valuable substance especially against infectious diseases.

*Example 5.*—15.4 grams of protocatechuic acid and 10 grams of antimony oxide are dissolved in 50 ccs. of 2 N-diethylamine solution by boiling and neutralizing with about 14 ccs. of 2 N-diethylamine solution. To the filtered solution which contains the diethylamine salt of the antimony protocatechuic acid, 9 grams of hydrogen peroxide (30%) are added. The solution is neutralized with diethylamine solution and evaporated. The new complex compound of the pentavalent antimony is a yellowish powder, easily soluble in water.

Example 6.—10 grams of the sodium salt of tin protocatechuic acid are dissolved in 100 ccs. of water. Subsequently a strong current of air is passed through the solution for some hours, and then the solution is evaporated. The complex compound of the tetra-valent tin is a pale colored substance, easily soluble in water.

In an analogous manner complex compounds of the said polyhydroxy benzenes with other metals which can be converted into a higher stage of oxidation, for example, arsenic, iron and vanadium, can be oxidized to form new organic metal complex compounds. Since the oxidation of the trivalent antimony compounds always leads to pentavalent antimony compounds which are of a higher degree of acidity than the trivalent antimony compounds, the oxidation product in Example 1 was neutralized with a water-soluble alkali as all of the products, according to the present invention, are intended for practical use only in the completely neutral state. The tin and manganese compounds obtainable according to the above examples are not changed in acidity and consequently do not need to be neutralized. Whether or not the oxidation product must be neutralized in order to obtain a neutral product, depends upon the amphoteric character of the metal contained therein. It is obvious that the arsenic compounds may require a subsequent neutralization as described with reference to the antimony compounds, whereas the iron compounds do not require such neutralization.

The second neutralization step described in Example 1 is carried out because, on redissolution of the product in water, some polymerization occurs as is usual with compounds of pentavalent antimony, which is suppressed by adding a little alkali, the polymerization being usually ascertained by the fact that an aqueous solution of the product becomes slightly acid.

I claim:

1. The process which comprises treating a metal complex salt of poly-hydroxy-benzenes of the general formula:

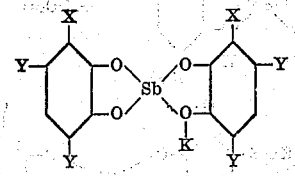

wherein X means hydrogen or a hydroxyl group, and at least one Y an acid reacting substituent capable of forming a salt, with hydrogen peroxide and neutralizing the reaction mixture.

2. The process which comprises treating potassium antimony di-(pyrocatechin-disulfonate) with hydrogen peroxide and neutralizing the reaction mixture with a water-soluble alkali.

3. The process which comprises treating potassium antimony di-(pyrogallol-disulfonate) with hydrogen peroxide and neutralizing the reaction mixture with a water-soluble alkali.

4. The process which comprises treating potassium antimony di-(pyrocatechin-disulfonate) with hydrogen peroxide solution of 3% strength, neutralizing the reaction mixture with diluted caustic potash and evaporating.

5. The process which comprises treating a mixture of almost equal quantities of potassium antimony di-(pyrogallol-disulfonate) and water with hydrogen peroxide solution of 15% strength, neutralizing with diluted caustic potash and precipitating the new complex compound by means of methyl alcohol.

6. The process which comprises treating with hydrogen peroxide a complex organo metallic compound composed of at least one polyhydroxy benzene nucleus which contains at least two hydroxy groups in ortho-position to each other, and of a metal selected from the group consisting of antimony, tin, manganese, arsenic, iron and vanadium, which metal is present in a lower stage of oxidation and attached to at least one of said polyhydroxy benzene nuclei through the oxygen atoms of the two hydroxy groups standing in ortho-position to each other, the polyhydroxy benzene nucleus furthermore containing at least one acid group, the hydrogen atom of which may be replaced by an alkali metal, and neutralizing the reaction mixture if necessary to produce a neutral product.

7. The process which comprises treating with an oxidizing agent a complex organo metallic compound composed of at least one polyhydroxy benzene nucleus which contains at least two hydroxy groups in ortho-position to each other, and of a metal of the group consisting of antimony, tin, arsenic, iron, vanadium and manganese, said metal being in a lower stage of oxidation and attached to at least one of the said polyhydroxy benzene nuclei through the oxygen atoms of the two hydroxy groups standing in ortho-position to each other, the polyhydroxy benzene nucleus furthermore containing at least one acid group, the hydrogen atom of which may be replaced by an alkali metal, and neutralizing the reaction mixture if necessary to produce a neutral product.

8. A salt of a complex organo metallic compound being composed of at least one polyhydroxy benzene nucleus which contains at least two hydroxy groups in ortho-position to each other, and of a metal of the group consisting of antimony, tin, arsenic, iron, vanadium and manganese, said metal being in its higher stage of oxidation and attached to at least one of the said polyhydroxy benzene nuclei through the oxygen atoms of the two hydroxy groups standing in ortho-position to each other, the polyhydroxy benzene nucleus furthermore containing at least one acid group, the hydrogen atom of which is replaced by an alkali metal, which product is a colored powder soluble in water and a therapeutically valuable substance which is generally less toxic than the corresponding metal complex compounds containing the metal in a lower stage of oxidation.

9. A salt of a complex organo metallic compound which is composed of at least one polyhydroxy benzene nucleus which contains at least two hydroxy groups in ortho-position to each other, and of tin, being in its higher stage of oxidation and attached to at least one of the said polyhydroxy benzene nuclei through the oxygen atoms of the two hydroxy groups standing in ortho-position to each other, the polyhydroxy benzene nucleus furthermore containing at least one acid group, the hydrogen atom of which is replaced by an alkali metal, which product is a whitish powder soluble in water and a therapeutically valuable substance which is generally less toxic than the corresponding metal complex compounds containing the metal in its lower stage of oxidation.

10. An alkali metal salt of a complex organo metallic compound which is composed of at least one molecule of pyrocatechin disulfonic acid and of tin, being in its higher stage of oxidation and attached to the said pyrocatechin sulfonic acid through the oxygen atoms of the hydroxyl groups thereof, which product is a whitish powder soluble in water and a therapeutically valuable substance which is generally less toxic than the corresponding metal complex compounds containing the metal in a lower stage of oxidation.

11. Potassium stannic pyrocatechin disulfonate, which is a whitish water soluble powder.

HANS SCHMIDT.